US009406291B2

(12) United States Patent
Niwa (10) Patent No.: US 9,406,291 B2
(45) Date of Patent: Aug. 2, 2016

(54) TRANSMISSION CIRCUIT, SEMICONDUCTOR DEVICE, ULTRASONIC SENSOR AND VEHICLE

(71) Applicant: Rohm Co., Ltd., Kyoto (JP)

(72) Inventor: Isao Niwa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 307 days.

(21) Appl. No.: 13/962,472

(22) Filed: Aug. 8, 2013

(65) Prior Publication Data

US 2014/0043940 A1 Feb. 13, 2014

(30) Foreign Application Priority Data

Aug. 10, 2012 (JP) ................................. 2012-177932

(51) Int. Cl.
| B06B 1/06 | (2006.01) |
| G10K 11/18 | (2006.01) |
| B06B 1/02 | (2006.01) |
| G01S 15/93 | (2006.01) |
| G01S 7/524 | (2006.01) |
| G01S 15/87 | (2006.01) |

(52) U.S. Cl.
CPC .............. *G10K 11/18* (2013.01); *B06B 1/0215* (2013.01); *G01S 7/524* (2013.01); *G01S 15/931* (2013.01); *B06B 2201/30* (2013.01); *G01S 15/87* (2013.01)

(58) Field of Classification Search
USPC ........................................................ 367/140
See application file for complete search history.

(56) References Cited

U.S. PATENT DOCUMENTS

| 4,000,650 | A | * | 1/1977 | Snyder ........................ 73/290 V |
| 4,402,095 | A | * | 9/1983 | Pepper .............................. 4/623 |
| 4,596,006 | A | * | 6/1986 | Eder ................................ 367/87 |
| 4,598,726 | A | * | 7/1986 | Pepper ............................. 137/1 |
| 4,679,175 | A | * | 7/1987 | Eder et al. ....................... 367/98 |
| 4,719,605 | A | * | 1/1988 | Eder et al. ....................... 367/98 |
| 4,788,998 | A | * | 12/1988 | Pepper et al. .................... 137/1 |
| 4,869,287 | A | * | 9/1989 | Pepper et al. ................. 137/391 |
| 5,313,947 | A | * | 5/1994 | Micco ........................... 600/455 |
| 5,347,495 | A | * | 9/1994 | Cherek et al. ................... 367/87 |
| 5,589,639 | A | * | 12/1996 | D'Antonio et al. ............. 73/724 |
| 5,768,939 | A | * | 6/1998 | Quayle et al. ............... 73/290 V |
| 2004/0020307 | A1 | * | 2/2004 | Eguchi et al. .............. 73/861.18 |

(Continued)

FOREIGN PATENT DOCUMENTS

| DE | 3513270 A1 * 10/1986 |
| DE | 102006041529 A1 * 3/2008 |

(Continued)

OTHER PUBLICATIONS

Kim, Insoo, et al. "CMOS ultrasound transceiver chip for high-resolution ultrasonic imaging systems." Biomedical Circuits and Systems, IEEE Transactions on 3.5 (2009): 293-303.*

(Continued)

*Primary Examiner* — James Hulka
*Assistant Examiner* — Jonathan Armstrong
(74) *Attorney, Agent, or Firm* — Fish & Richardson P.C.

(57) ABSTRACT

A transmission circuit transmits an ultrasonic signal from an ultrasonic vibrator by driving a terminal voltage of the ultrasonic vibrator using a first pulse signal and then further driving the terminal voltage using a second pulse signal having an opposite phase to the first pulse signal. At least one of a pulse number of the second pulse signal and a pulse level of the terminal voltage is arbitrarily set.

14 Claims, 13 Drawing Sheets

(56) References Cited

U.S. PATENT DOCUMENTS

| | | | |
|---|---|---|---|
| 2011/0245750 A1* | 10/2011 | Lynch et al. | 604/5.01 |
| 2013/0177455 A1* | 7/2013 | Kamen et al. | 417/313 |
| 2013/0336814 A1* | 12/2013 | Kamen et al. | 417/282 |
| 2014/0043940 A1* | 2/2014 | Niwa | 367/87 |

FOREIGN PATENT DOCUMENTS

| | | | |
|---|---|---|---|
| JP | 08-146121 | | 6/1996 |
| JP | 08146121 A | * | 6/1996 |
| JP | 2001264039 A | * | 9/2001 |
| WO | WO 2013035643 | * | 3/2013 |

OTHER PUBLICATIONS

Svilainis, L., and G. Motiejunas. "Power amplifier for ultrasonic transducer excitation." Ultragarsas 1.58 (2006): 30-36.*

Svilainis, L., V. Dumbrava, and G. Motiejunas. "Optimization of the ultrasonic excitation stage." Information Technology Interfaces, 2008. ITI 2008. 30th International Conference on. IEEE, 2008.*

Ma, Haifeng, Ronan van der Zee, and Bram Nauta. "Design and Analysis of a High-Efficiency High-Voltage Class-D Power Output Stage." Solid-State Circuits, IEEE Journal of 49.7 (2014): 1514-1524.*

MaxBotix® Inc. HRXL-MaxSonare®—WT/WRC™ Series High Resolution, IP67 Weather Resistant, Ultra Sonic Range Finder. 2012.*

Wang, Hongzhan, and Huafeng Li. "A PSoC-based parallel inductor connection driver of ultrasonic motor." Electrical Machines and Systems, 2008. ICEMS 2008. International Conference on. IEEE, 2008.*

Chebli, Robert, and Mohamad Sawan. "A CMOS high-voltage DC-DC up converter dedicated for ultrasonic applications." System-on-Chip for Real-Time Applications, 2004. Proceedings. 4th IEEE International Workshop on. IEEE, 2004.*

Chen, Kailiang, Anantha P. Chandrakasan, and Charlie G. Sodini. "Ultrasonic imaging front-end design for cmut: A 3-level 30vpp pulse-shaping pulser with improved efficiency and a noise-optimized receiver." Solid State Circuits Conference (A-SSCC), 2012 IEEE Asian. IEEE, 2012.*

* cited by examiner

TRANSMISSION CIRCUIT, SEMICONDUCTOR DEVICE, ULTRASONIC SENSOR AND VEHICLE

CROSS-REFERENCE TO RELATED APPLICATIONS

This application is based upon and claims the benefit of priority from Japanese Patent Application No. 2012-177932, filed on Aug. 10, 2012, the entire contents of which are incorporated herein by reference.

TECHNICAL FIELD

The present disclosure relates to a transmission circuit for use with an ultrasonic sensor, a semiconductor device including the transmission circuit, an ultrasonic sensor including the semiconductor device and a vehicle including the ultrasonic sensor.

BACKGROUND

An ultrasonic sensor has been conventionally used, which can determine the presence or absence of an object or measure a distance between the sensor and an object by using a single ultrasonic vibrator to transmit an ultrasonic signal and receive a reflected signal. Such an ultrasonic sensor cannot correctly receive the reflected signal until reverberation (i.e., terminal voltage swing that continues to some extent after driving signals for the ultrasonic vibrator are stopped), produced after the transmission of the ultrasonic signal, is stabilized. Therefore, the conventional ultrasonic sensor has to take a measure against the reverberation, such as masking the received signal until a predetermined period of time elapses after transmitting the ultrasonic signal, in order to prevent the reflected signal from being incorrectly detected.

However, the configuration of masking the received signal over the predetermined period of time after transmitting the ultrasonic signal has a problem in that the reflected signal cannot be correctly detected if the reflected signal is returned immediately after transmitting the ultrasonic signal (that is, it is difficult to make determination on the presence or absence of a near object or measure a distance between the sensor and the near object).

In the related art, a technique is disclosed for eliminating reverberation by driving an ultrasonic vibrator with a reverberation inhabitation signal having an opposite phase to an ultrasonic signal for a predetermined period corresponding to a half cycle of the ultrasonic signal immediately after stopping the ultrasonic signal (i.e., by setting a final pulse width of the ultrasonic signal to be twice as large as normal). However, since the ultrasonic vibrator has its own inherent reverberation property, the conventional technique cannot obtain a sufficient reverberation inhabitation effect in some cases.

SUMMARY

The present disclosure provides some embodiments of a transmission circuit which is capable of properly inhibiting reverberation of an ultrasonic vibrator.

According to one embodiment of the present disclosure, there is provided a transmission circuit which transmits an ultrasonic signal from an ultrasonic vibrator by driving a terminal voltage of the ultrasonic vibrator using a first pulse signal and then further driving the terminal voltage using a second pulse signal having the opposite phase to the first pulse signal, wherein at least one of a pulse number of the second pulse signal and a pulse level of the terminal voltage is arbitrarily set.

The transmission circuit may include: a first pulse signal generator configured to generate the first pulse signal; a second pulse signal generator configured to generate the second pulse signal after the generation of the first pulse signal is stopped; a logical summing unit configured to generate a third pulse signal by performing a logical summing operation for the first pulse signal and the second pulse signal; and a driver configured to actuate the terminal voltage using the third pulse signal.

The transmission circuit may further include an oscillator configured to supply a common driving clock signal to both of the first pulse signal generator and the second pulse signal generator.

The second pulse signal generator may set the pulse number of the second pulse signal based on pulse number set data.

The driver may set the pulse level of the terminal voltage based on pulse level set data.

The driver may include a transformer configured to generate the terminal voltage based on the third pulse signal, and a turns ratio of the transformer may be switched based on the pulse level set data.

According to another embodiment of the present disclosure, there is provided a semiconductor device including: the above-described transmission circuit configured to transmit an ultrasonic signal from an ultrasonic vibrator; a reception circuit configured to receive a reflected signal detected by the ultrasonic vibrator; and a control circuit configured to control a transmission operation of the transmission circuit and a reception operation of the reception circuit in a time-sharing manner, wherein the transmission circuit, the reception circuit and the control circuit are integrated into a single chip.

The control circuit may set at least one of the pulse number of the second pulse signal and the pulse level of the terminal voltage based on externally-input set data.

The semiconductor device may further include an integrated register configured to store the set data.

According to another embodiment of the present disclosure, there is provided an ultrasonic sensor including: the above-described semiconductor device; and an ultrasonic vibrator connected to the semiconductor device.

According to another embodiment of the present disclosure, there is provided a vehicle including the above-described ultrasonic sensor as at least one of a corner sonar and a back sonar.

DETAILED DESCRIPTION

Reference will now be made in detail to various embodiments, examples of which are illustrated in the accompanying drawings. In the following detailed description, numerous specific details are set forth in order to provide a thorough understanding of the present invention(s). However, it will be apparent to one of ordinary skill in the art that the present invention(s) may be practiced without these specific details. In other instances, well-known methods, procedures, systems, and components have not been described in detail so as not to unnecessarily obscure aspects of the various embodiments.

<Vehicle>

Figure 1:
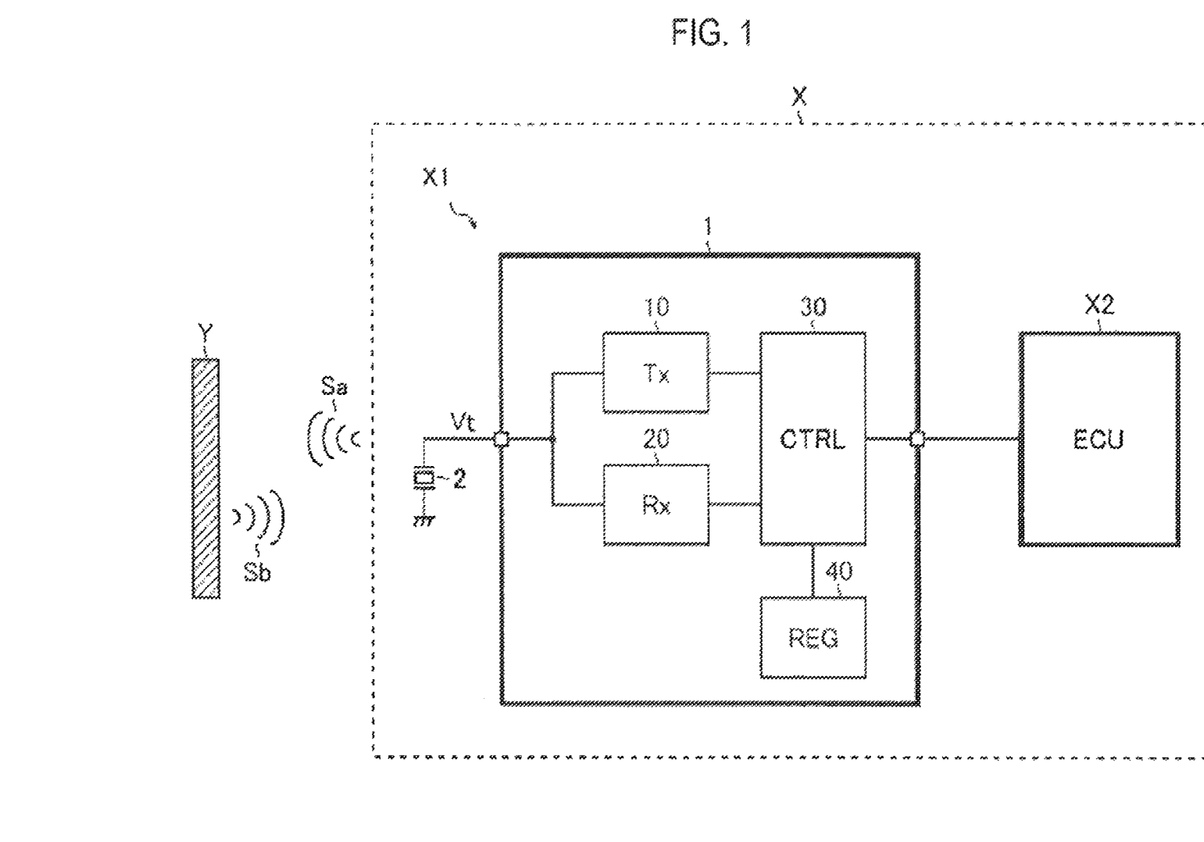
FIG. 1 is a block diagram showing an example configuration of a vehicle equipped with an ultrasonic sensor.
Figure 2:
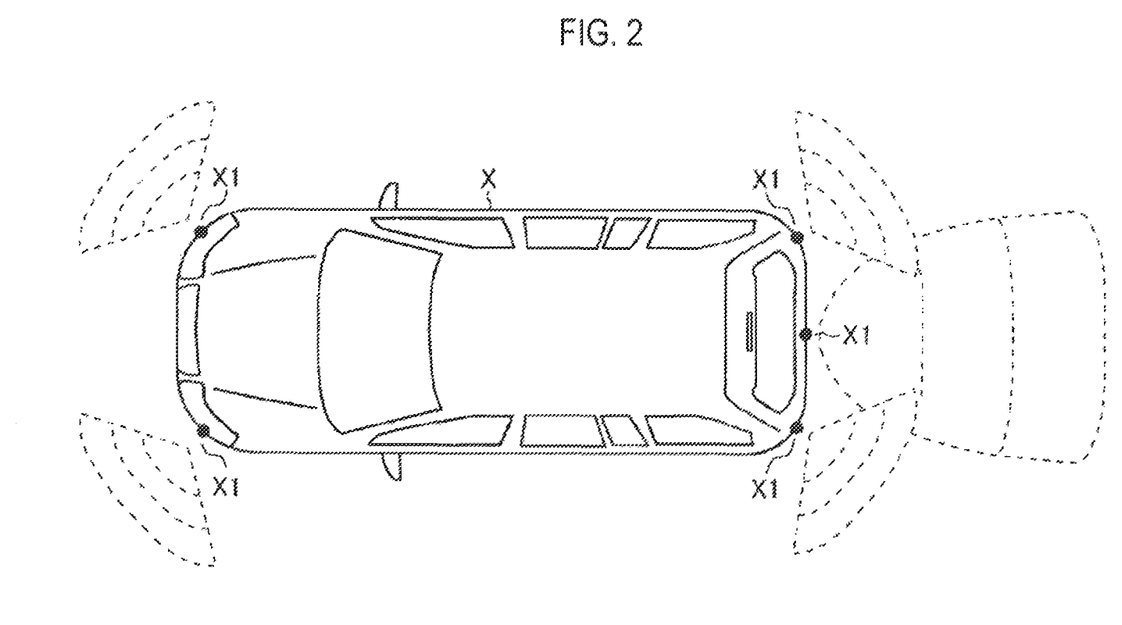
FIG. 2 is an external appearance view showing the example configuration of the vehicle equipped with the ultrasonic sensor of FIG. 1.

FIGS. 1 and 2 are a block diagram and an external appearance view showing an example configuration of a vehicle equipped with an ultrasonic sensor, respectively. In the example configuration, a vehicle X has ultrasonic sensors X1 and an electronic control unit (ECU) X2.

The ultrasonic sensors X1 are electronic parts mounted on four corners and a rear center of the vehicle X and serve as corner sonars or back sonars of the vehicle X. Each of the ultrasonic sensors X1 includes a semiconductor device 1 and an ultrasonic vibrator (piezo-electric element) 2 connected to the semiconductor device 1.

The semiconductor device 1 is a monolithic semiconductor integrated circuit device. The semiconductor device 1 uses the ultrasonic vibrator 2 connected thereto to transmit an ultrasonic signal (transmission signal) Sa and receive a reflected signal (reception signal) Sb. The semiconductor device 1 includes a transmission circuit 10, a reception circuit 20, a control circuit 30 and a register 40. The ultrasonic vibrator 2 uses a piezo-electric element such as lead zirconate titanate (PZT) to perform mutual conversion between an electric signal (electric energy) and an ultrasonic wave (vibration energy).

The transmission circuit 10 drives the ultrasonic vibrator 2 to transmit the ultrasonic signal Sa. In more detail, upon transmitting the ultrasonic signal Sa using the ultrasonic vibrator 2, the transmission circuit 10 pulse drives a terminal voltage Vt of the ultrasonic vibrator 2 according to a command from the control circuit 30.

The reception circuit 20 receives the reflected signal Sb detected by the ultrasonic vibrator 2. In more detail, upon receiving the reflected signal Sb using the ultrasonic vibrator 2, the reception circuit 20 detects the terminal voltage Vt of the ultrasonic vibrator 2 and delivers it to the control circuit 30.

The control circuit 30 controls a transmission operation of the ultrasonic signal Sa by the transmission circuit 10 and a reception operation of the reflected signal Sb by the reception circuit 20 in a time-sharing manner. The control circuit 30 sets an operation condition of the ultrasonic sensor X1 based on various set data (including pulse number set data D11 and D12, pulse level set data D14, frequency set data D15, etc., which will be described later) stored in the register 40.

The register 40 stores various set data required to set the operation condition of the ultrasonic sensor X1. The various set data stored in the register 40 may be optionally rewritable from the external of the semiconductor device 1.

The ultrasonic sensor X1 as configured above performs a determination on the presence or absence of an object Y or measurement on a distance between the sensor X1 and the object Y by transmitting the ultrasonic signal Sa around the vehicle X and then receiving the reflected signal Sb returning from the object Y, and delivers a result of the determination or measurement to the electronic control unit X2.

The electronic control unit X2 detects the object Y (an obstacle such as a wall or the like) present around the vehicle X based on the result of the determination or measurement by the ultrasonic sensor X1 and actuates an alarm or an indicator lamp (not shown) based on the distance from the object Y to prompt a caution message to the driver. This configuration can prevent the driver from having a fender-bender accident due to careless driving when the driver gets out of a garage or a narrow road.

Figure 3:
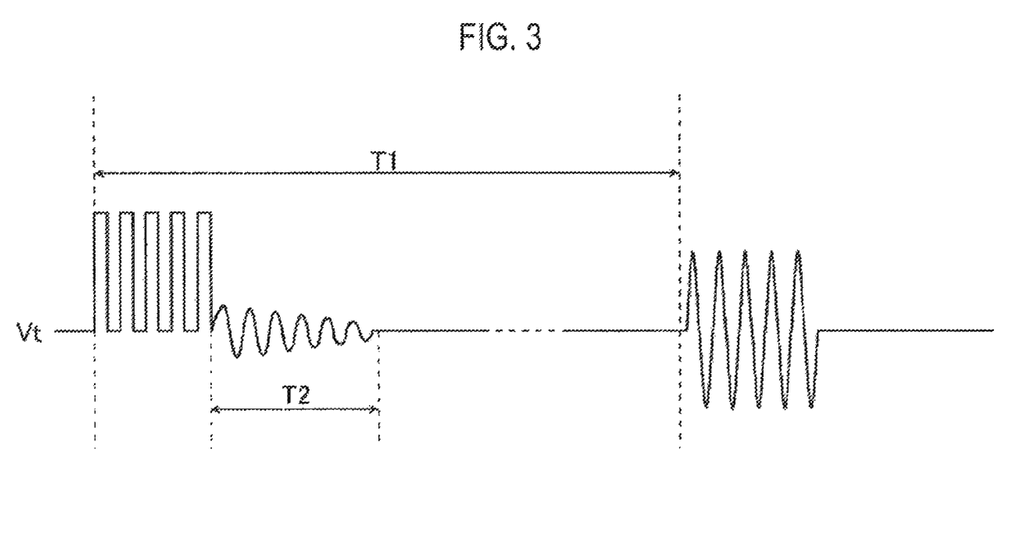
FIG. 3 is a waveform diagram for illustrating an operation principle of the ultrasonic sensor.

FIG. 3 is a waveform diagram for illustrating an operation principle of the ultrasonic sensor X1 and depicts a temporal change in the terminal voltage Vt. When the distance from the object Y is measured using the ultrasonic sensor X1, the ultrasonic signal Sa is transmitted around the vehicle X, the reflected signal Sb returning from the object is received, and propagation time T1 (i.e., time taken until the reflected signal Sb is received after the ultrasonic signal Sa is transmitted) is measured. A shorter propagation time T1 means a shorter distance between the vehicle X and the object Y.

However, in the ultrasonic sensor X1, the reflected signal Sb cannot be correctly received until reverberation (swing of the terminal voltage Vt) of the ultrasonic vibrator 2 produced after the transmission of the ultrasonic signal Sa is stabilized. That is, the reflected signal Sb cannot be correctly received until reverberation time T2 (i.e., a time duration during which the reverberation exists) lapses. Accordingly, in order to provide a correct determination on the presence or absence of the object Y located at a close range from the ultrasonic sensor X1 or correct measurement of the distance between the vehicle X and the object Y, there is a need to suppress the reverberation of the ultrasonic vibrator 2 appropriately to reduce the reverberation time T2.

<Transmission Circuit>

Figure 4:
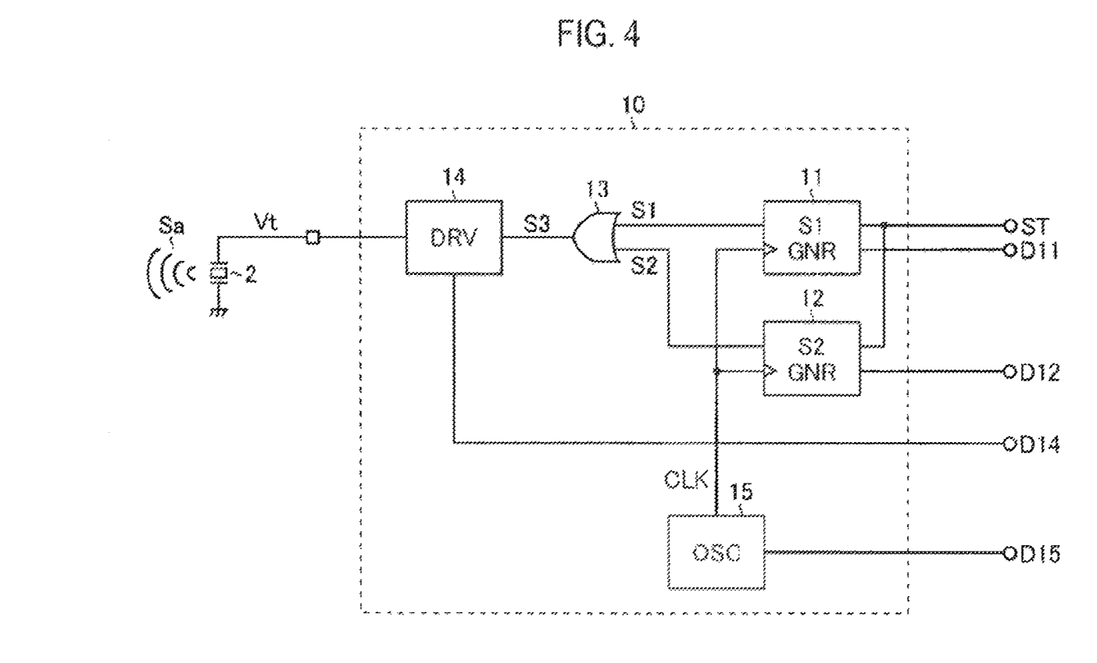
FIG. 4 is a block diagram showing an example configuration of a transmission circuit.

FIG. 4 is a block diagram showing an example configuration of the transmission circuit 10. In this example configuration, the transmission circuit 10 includes a first pulse signal generator 11, a second pulse signal generator 12, an OR gate 13, a driver 14 and an oscillator 15.

Figure 5:
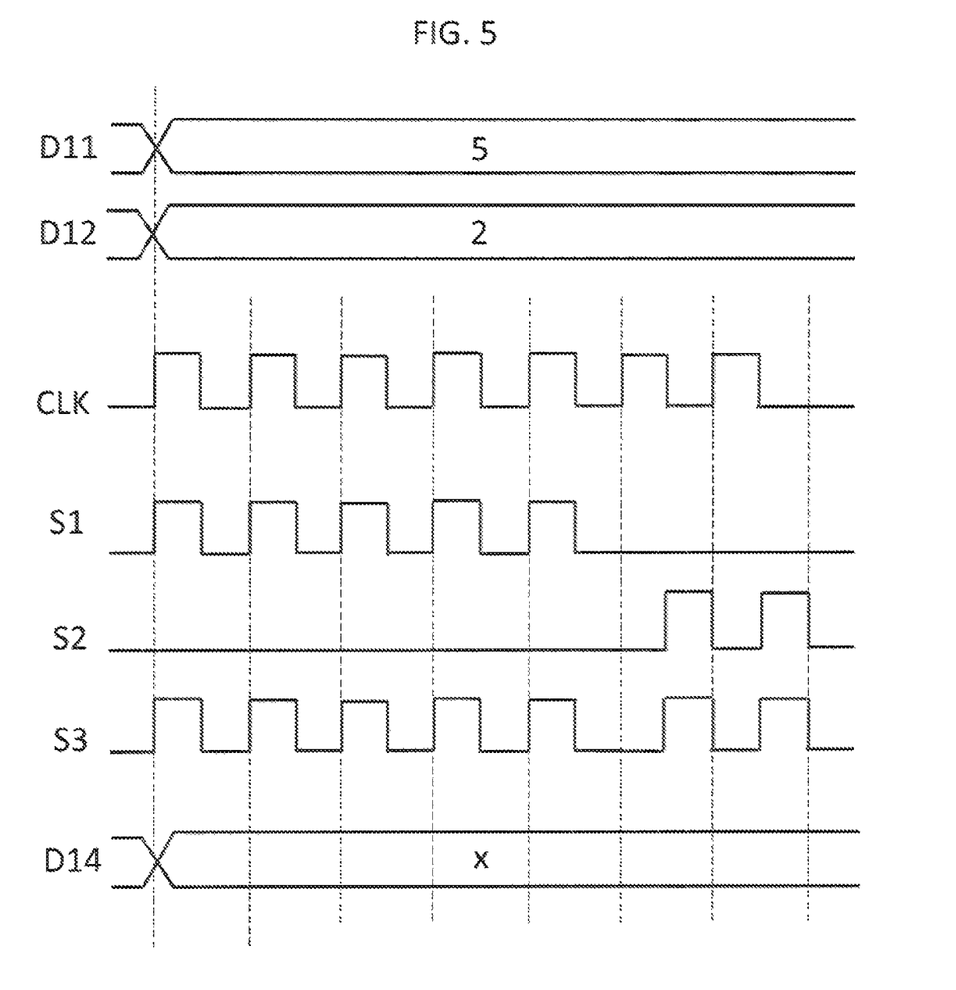
FIG. 5 is a waveform diagram for illustrating a pulse signal generating operation.

The first pulse signal generator 11 generates a first pulse signal S1 (main signal) in synchronization with a driving clock signal CLK, as shown in FIG. 5. The first pulse signal generator 11 determines a generation timing of the first pulse signal S1 based on a timing control signal ST input from the control circuit 30. The first pulse signal generator 11 sets a pulse number of the first pulse signal S1 based on the pulse number set data D11 input from the control circuit 30.

The second pulse signal generator 12 generates a second pulse signal S2 (reverberation inhabitation signal) having an opposite phase to the first pulse signal S1 in synchronization with the driving clock signal CLK, after the generation of the pulse signal S1 is stopped, as shown in FIG. 5. The second pulse signal generator 12 determines a generation timing of the second pulse signal S2 based on the timing control signal ST input from the control circuit 30. The second pulse signal generator 12 sets a pulse number of the second pulse signal S2 based on the pulse number set data D12 input from the control circuit 30.

The OR gate 13 generates a third pulse signal S3 by performing a logical sum (ORing) of the first pulse signal S1 and the second pulse signal S2. The third pulse signal S3 has a high level when at least one of the first pulse signal S1 and the second pulse signal S2 has a high level, and has a low level when both of the first pulse signal S1 and the second pulse signal S2 have a low level, as shown in FIG. 5.

The driver 14 uses the third pulse signal S3 to drive the terminal voltage Vt. The driver 14 sets a pulse level of the terminal voltage Vt based on the pulse level set data D14 input from the control circuit 30. Configuration and operation of the driver 14 will be described in detail later.

The oscillator 15 supplies the driving clock signal CLK to both of the first pulse signal generator 11 and the second pulse signal generator 12. The oscillator sets a frequency of the driving clock signal CLK based on the frequency set data D15 input from the control circuit 30.

The transmission circuit 10 of this example configuration drives the terminal voltage Vt of the ultrasonic vibrator 2 using the first pulse signal S1 when transmitting the ultrasonic signal Sa from the ultrasonic vibrator 2 and then further drives the terminal voltage Vt using the second pulse signal S2 having the opposite phase to the first pulse signal S1. This pulse generation operation can suppress the reverberation of the ultrasonic vibrator 2, thereby realizing a close range measurement (i.e., a measurement of the distance between the ultrasonic sensor X1 and the object Y that is located at a close range from the ultrasonic sensor X1) and improving a signal-to-noise (S/N) ratio.

In addition, in the transmission circuit 10 of this example configuration, the pulse number of the second pulse signal S2 can be arbitrarily set based on the pulse number set data D12 input from the control circuit 30. This configuration can optimize the pulse number of the second pulse signal S2 in compliance with an inherent reverberation property of the ultrasonic vibrator 2, thereby allowing a more effective suppression of the reverberation of the ultrasonic vibrator 2.

Figure 6A:
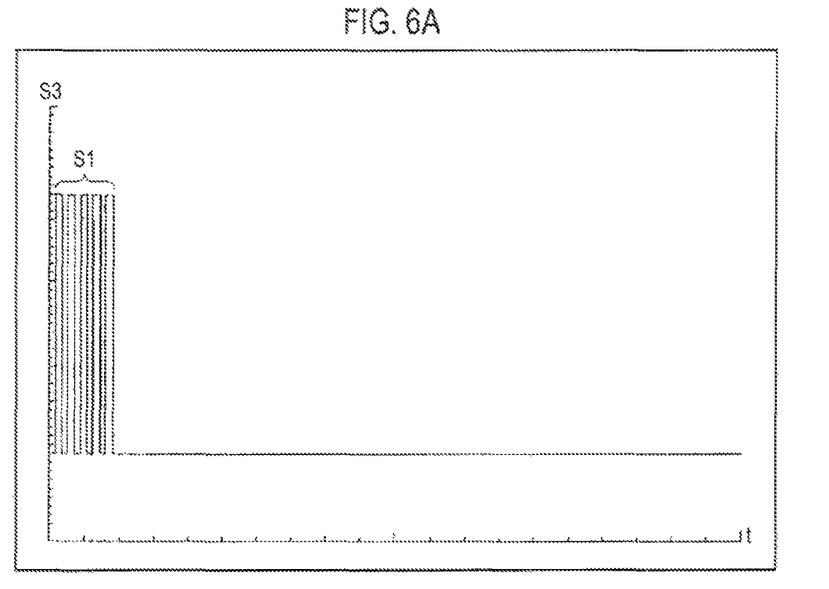
FIGS. 6A and 6B are waveform diagrams of a third pulse signal S3 and a terminal voltage Vt of a first example of the transmission circuit, respectively.
Figure 6B:
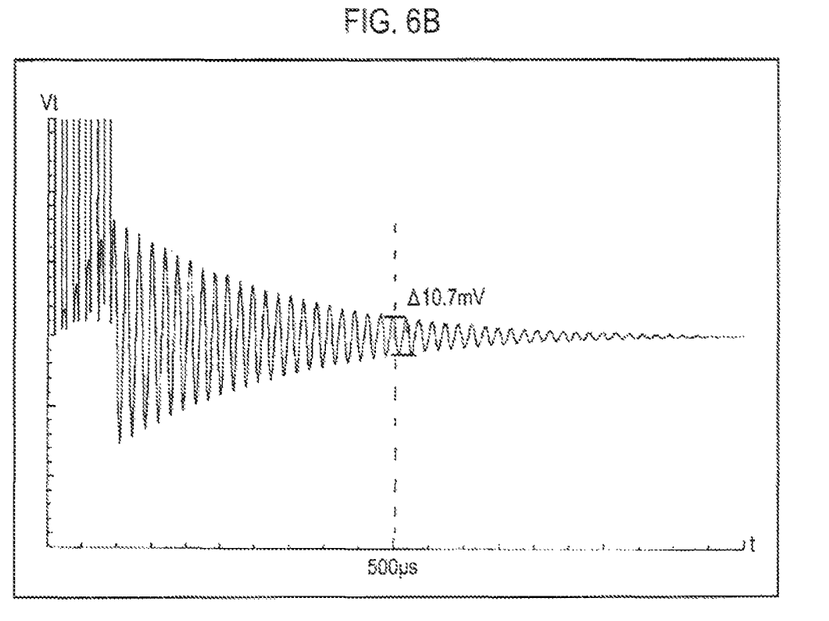

FIG. 6A is a waveform diagram of the third pulse signal S3, and FIG. 6B is a waveform diagram of the terminal voltage Vt of a first example of the transmission circuit 10. In the first example, the pulse number of the first pulse signal S1 (55 kHz) is set to 5 and the pulse number of the second pulse signal S2 is set to 0. In this case, a reverberation level (a peak-to-peak value of the terminal voltage Vt) after the lapse of 500 μs from the start of transmission of the first pulse signal S1 is Δ10.7 mV.

Figure 7A:
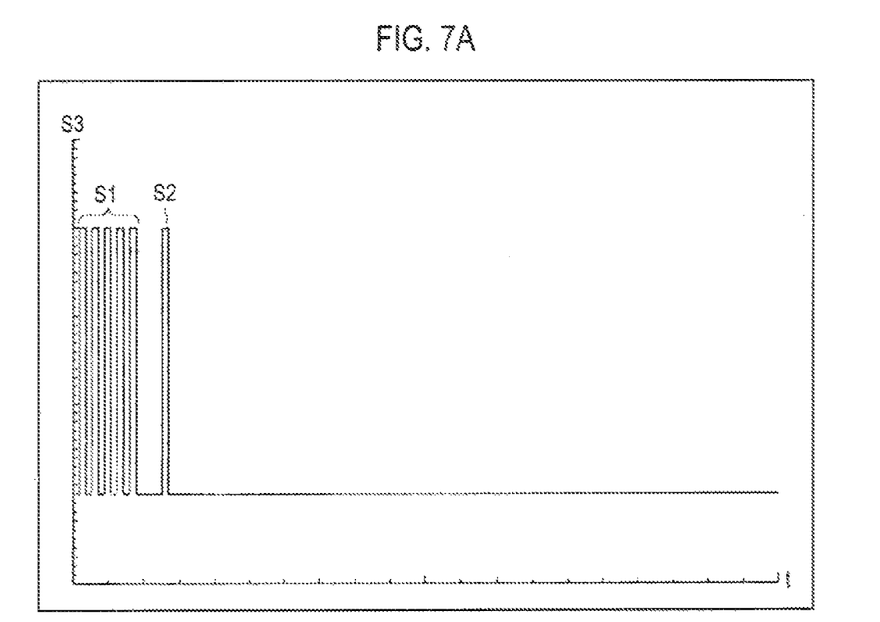
FIGS. 7A and 7B are waveform diagrams of a third pulse signal S3 and a terminal voltage Vt of a second example of the transmission circuit, respectively.
Figure 7B:
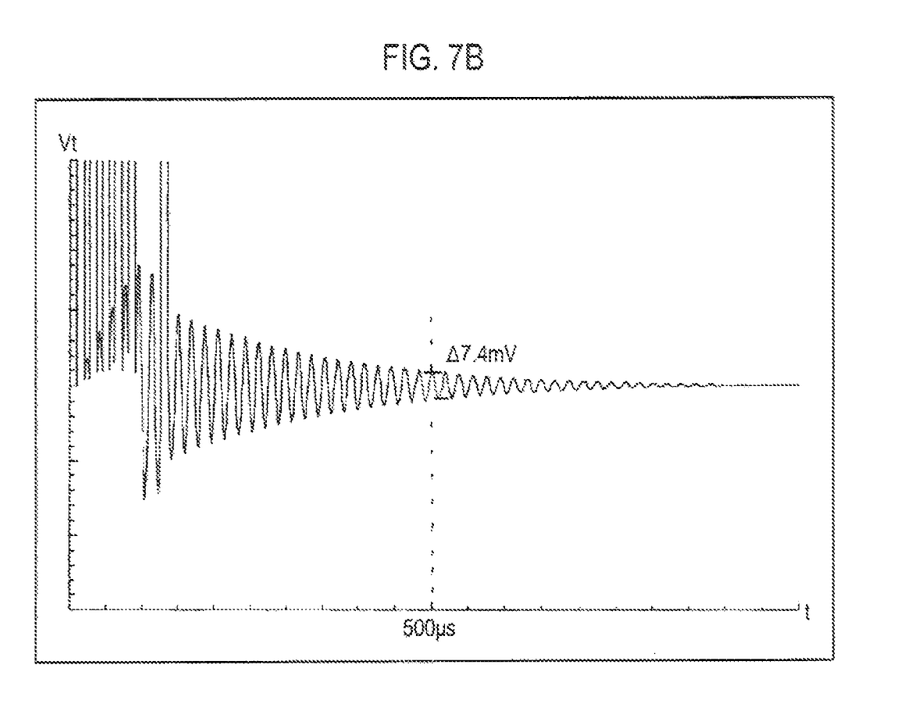

FIG. 7A is a waveform diagram of the third pulse signal S3, and FIG. 7B is a waveform diagram of the terminal voltage Vt of a second example of the transmission circuit 10. In the second example, the pulse number of the first pulse signal S1 (55 kHz) is set to 5 and the pulse number of the second pulse signal S2 is set to 1. In this case, a reverberation level (a peak-to-peak value of the terminal voltage Vt) after the lapse of 500 μs from the transmission start of the first pulse signal S1 is Δ7.4 mV.

Figure 8A:
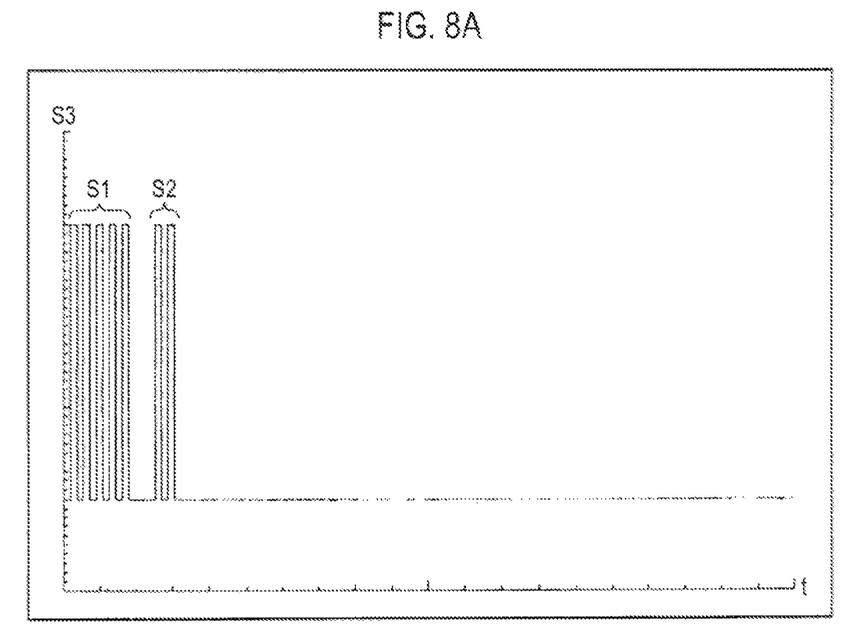
FIGS. 8A and 8B are waveform diagrams of a third pulse signal S3 and a terminal voltage Vt of a third example of the transmission circuit, respectively.
Figure 8B:
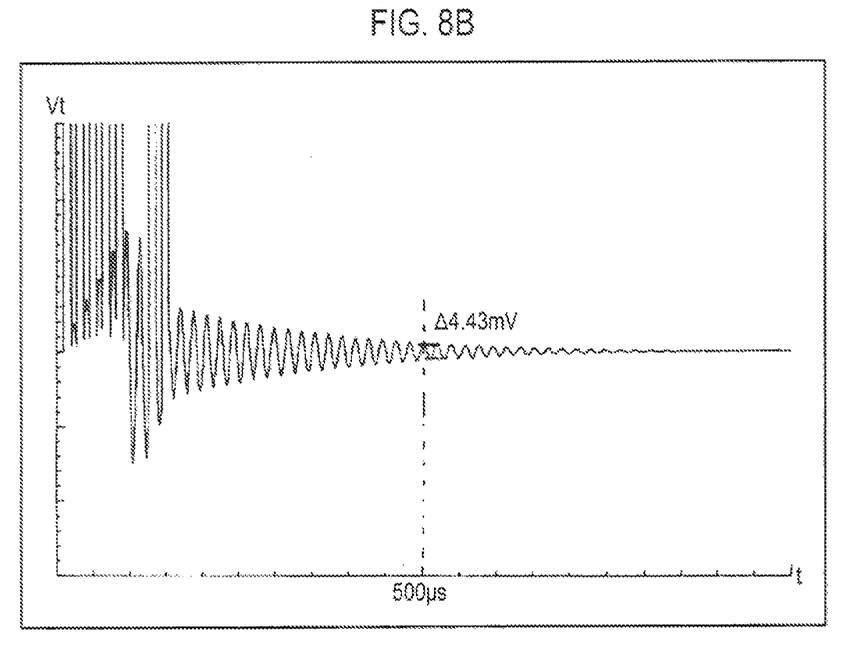

FIG. 8A is a waveform diagram of the third pulse signal S3, and FIG. 8B is a waveform diagram of the terminal voltage Vt of a third example of the transmission circuit 10. In the third example, the pulse number of the first pulse signal S1 (55 kHz) is set to 5 and the pulse number of the second pulse signal S2 is set to 2. In this case, a reverberation level (a peak-to-peak value of the terminal voltage Vt after the lapse of 500 μs from the transmission start of the first pulse signal S1 is Δ4.43 mV.

In the first to third examples, the higher pulse number of the second pulse signal S2 can provide the lower reverberation level of the ultrasonic vibrator 2. However, depending on the reverberation property of the ultrasonic vibrator 2, the pulse number of the second pulse signal S2 to 1 may be adjusted to more effectively suppress the reverberation level of the ultrasonic vibrator 2. Accordingly, in order to cope with various ultrasonic vibrators 2, it is important to allow the pulse number of the second pulse signal S2 to be arbitrarily set.

<Driver>

Figure 9:
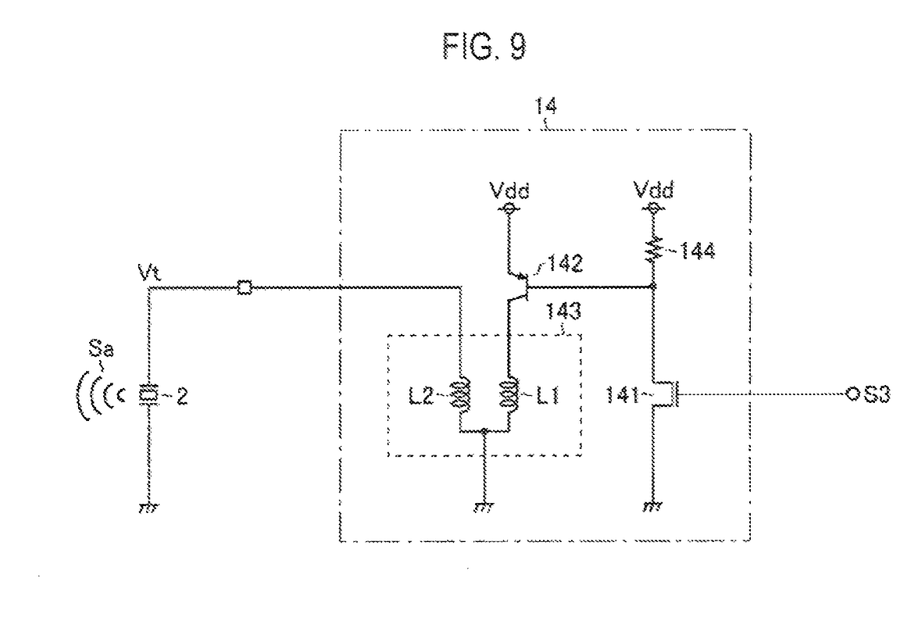
FIG. 9 is a circuit diagram showing a first example configuration of a driver.

FIG. 9 is a circuit diagram showing a first example configuration of the driver 14. In the first example configuration, the driver 14 includes an N channel MOS (Metal Oxide Semiconductor) field effect transistor 141, a pnp bipolar transistor 142, a transformer 143 and a resistor 144.

A drain of the N channel MOS field effect transistor 141 is connected to a base of the pnp bipolar transistor 142. A source of the N channel MOS field effect transistor 141 is connected to a ground terminal. A gate of the N channel MOS field effect transistor 141 is connected to an application terminal of the third pulse signal S3. An emitter of the pnp bipolar transistor 142 is connected to an application terminal of a power source voltage Vdd. A collector of the pnp bipolar transistor 142 is connected to a first terminal of a primary winding L1 forming the transformer 143. A first terminal of a secondary winding L2 forming the transformer 143 is connected to a first terminal of the ultrasonic vibrator 2 (an application terminal of the terminal voltage Vt). A second terminal of the primary winding L1 and a second terminal of the secondary winding L2 are connected to the ground terminal in common. A first terminal of the resistor 144 is connected to the application terminal of the power source voltage Vdd. A second terminal of the resistor 144 is connected to a base of the pnp bipolar transistor 142. A turn ratio of the primary winding L1 and the secondary winding L2 is set to, for example, 1:10.

When the third pulse signal S3 has a high level, the N channel MOS field effect transistor 141 and the pnp bipolar transistor 142 are turned on and a primary current is supplied into the primary winding L1 of the transformer 143. On the other hand, when the third pulse signal S3 has a low level, the N channel MOS field effect transistor 141 and the pnp bipolar transistor 142 are turned off and the primary current flowing into the primary winding L1 of the transformer 143 is cut off. By supplying/cutting off of the primary current, the terminal voltage Vt (for example, 10×Vdd) based on the turns ratio of the primary winding L1 and the secondary winding L2 is generated in the first terminal of the secondary winding L2 to which the primary winding L1 is magnetically coupled.

In this manner, when the transformer 143 is configured to generate the terminal voltage Vt based on the third pulse signal S3, the terminal voltage Vt can be raised to a desired value with a very simple configuration.

Although it has been illustrated in the first example configuration that the pulse level of the terminal voltage Vt is fixed, it is also possible to allow the pulse level of the terminal voltage Vt to be arbitrarily set in order to cope with various ultrasonic vibrators 2.

Figure 10:
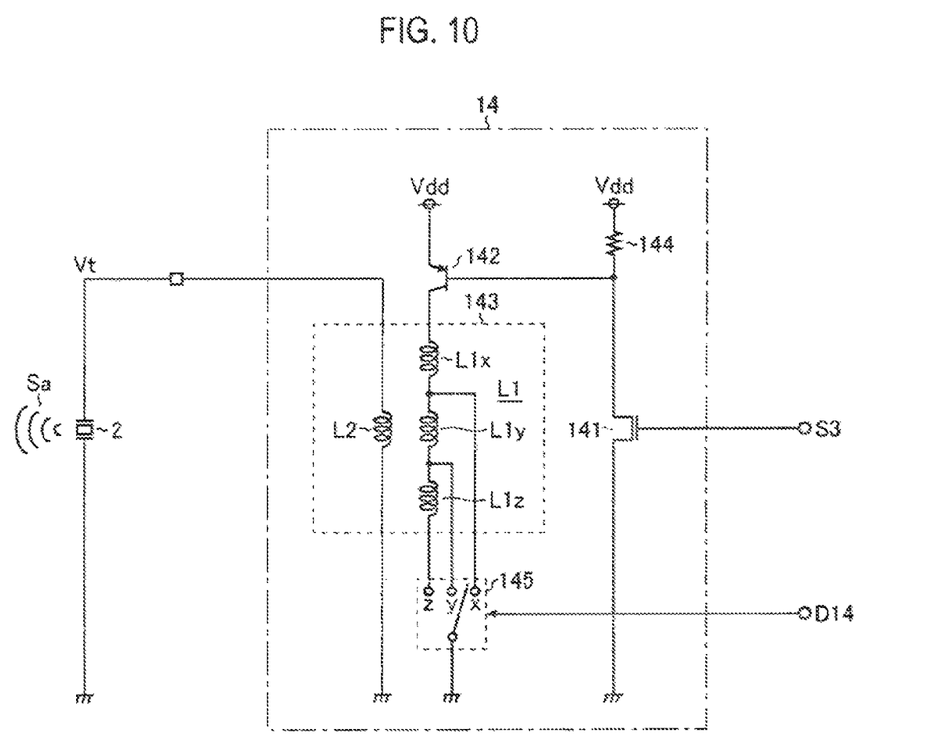
FIG. 10 is a circuit diagram showing a second example configuration of the driver.

FIG. 10 is a circuit diagram showing a second example configuration of the driver 14. In the second example configuration, the driver 14 has basically the same configuration as the first example configuration except that the primary winding L1 is divided into three primary windings L1x, L1y and L1z for variable control of the turns ratio of the transformer 143 and a selector 145 to select one of these primary windings L1x, L1y and L1z is further provided. Therefore, the same elements as the first example configuration are denoted by the same reference numerals as FIG. 9, and explanation of which for these same elements will not be repeated. The following description is focused on characteristic portions of the second example configuration.

A first terminal of the primary winding L1x is connected to the collector of the pnp bipolar transistor 142. A second terminal of the primary winding L1x is connected to a first terminal of the primary winding L1y and a first selection terminal x of the selector 145. A second terminal of the primary winding L1y is connected to a first terminal of the primary winding L1z and a second selection terminal y of the selector 145. A second terminal of the primary winding L1z is connected to a third selection terminal z of the selector 145. A common terminal of the selector 145 is connected to the ground terminal. A control terminal of the selector 145 is connected to an application terminal of the pulse level set data D14.

A turns ratio of the primary windings L1x, L1y and L1z and the secondary winding L2 is set to, for example, 1:1:1:10. In the selector 145, if the first selection terminal x makes electric conduction with the common terminal, only the primary winding L1x is selected as the primary winding L1. Accordingly, a turns ratio of the primary winding L1 and the secondary winding L2 becomes 1:10. In the selector 145, if the second selection terminal y makes electric conduction with the common terminal, the primary windings L1x and L1y are selected as the primary winding L1. Accordingly, a turns ratio of the primary winding L1 and the secondary winding L2 becomes 2:10. In the selector 145, if the third selection terminal z makes electric conduction with the common terminal, all of the primary windings L1x to L1z are selected as the primary winding L1. Accordingly, a turns ratio of the primary winding L1 and the secondary winding L2 becomes 3:10.

In other words, the driver 14 of the second example configuration can arbitrarily set the pulse level of the terminal voltage Vt to one of 100% (=10×Vdd), 50% (=5×Vdd) and 33% (=3×Vdd), by switching the turns ratio of the transformer 143 based on the pulse level set data D14. This configuration can optimize the pulse level of the terminal voltage Vt in compliance with an inherent reverberation property of the ultrasonic vibrator 2, thereby allowing more effective suppression of the reverberation of the ultrasonic vibrator 2.

Figure 11:
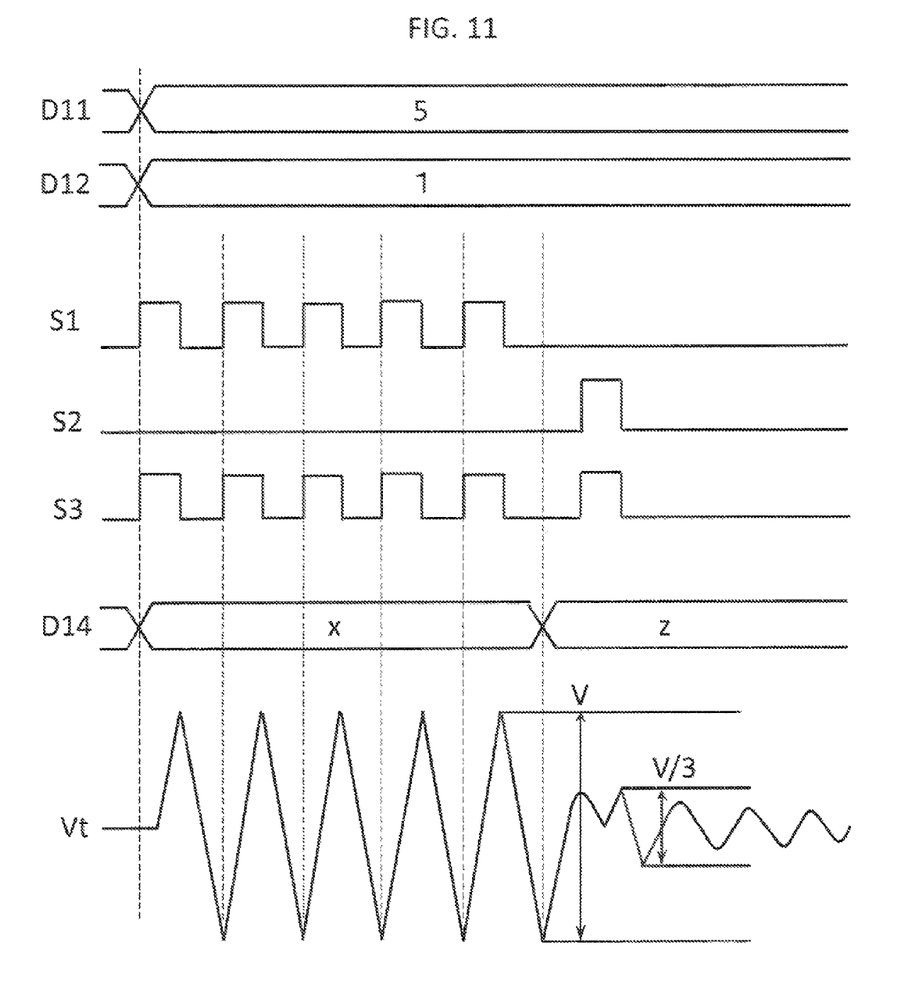
FIG. 11 is a waveform diagram for illustrating a pulse level switching operation.

FIG. 11 is waveform diagrams used to illustrate a pulse level switching operation, showing the pulse signals S1 to S3, the pulse level set data D14 and the terminal voltage Vt in this order from the top. FIG. 11 depicts that the pulse level of the terminal voltage Vt is 100% when the first pulse signal S1 is output and the pulse level of the terminal voltage Vt is switched to 33% when the second pulse signal S2 is outputted.

Figure 12:
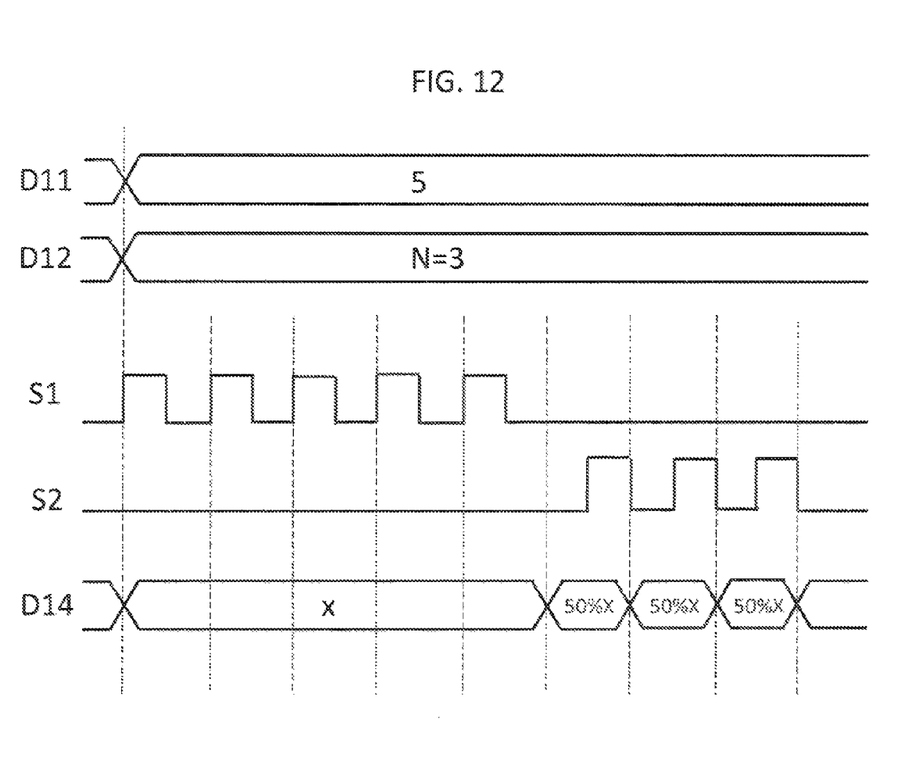
FIG. 12 is a waveform diagram of a second example for illustrating a pulse level switching operation.
Figure 13:
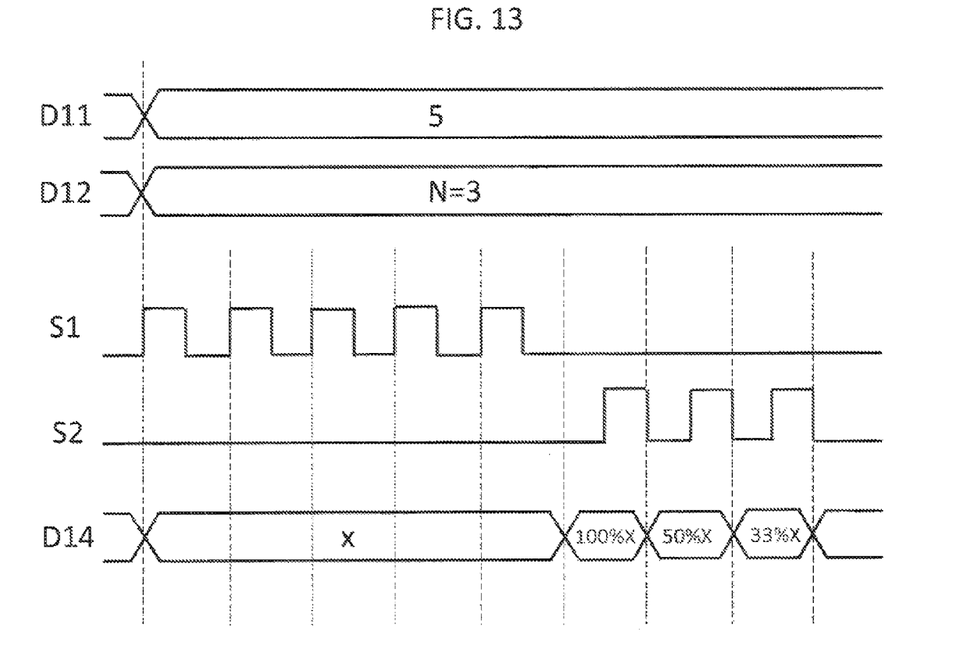
FIG. 13 is a waveform diagram of a third example for illustrating a pulse level switching operation.

However, the pulse level switching operation is not limited thereto. For example, if N pulses are generated as the second pulse signal S2, the pulse level of the N pulses may be set to 50% (as shown in FIG. 12), to 33% or different pulse levels may be set for different pulses, such as 100% for a first pulse, 50% for a second pulse and 33% for a third pulse as shown in FIG. 13.

<Other Modifications>

Although the above embodiments have been illustrated with the in-vehicle sonar as an applicable object of the present disclosure, without being limited thereto, the present disclosure can have the wide applicability to any ultrasonic sensors which use an ultrasonic vibrator to transmit/receive a signal.

The present disclosure can be employed to improve a close range measurement capability and measurement accuracy of, for example, in-vehicle sonars.

According to the present disclosure in some embodiments, it is possible to provide a transmission circuit which is capable of properly inhibiting reverberation of an ultrasonic vibrator.

While certain embodiments have been described, these embodiments have been presented by way of example only, and are not intended to limit the scope of the disclosures. For example, the exchange between the bipolar transistor and the MOS field effect transistor and the reversal of logic level of various signals may be optional. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A transmission circuit comprising:
an ultrasonic vibrator configured to generate an ultrasonic signal; and
a register configured to store a pulse number set data and a pulse level set data,
wherein the transmission circuit transmits the ultrasonic signal from the ultrasonic vibrator by driving a terminal voltage of the ultrasonic vibrator using a first pulse signal and then further driving the terminal voltage using a second pulse signal having an opposite phase to the first pulse signal,
wherein a pulse number of the second pulse signal is set by the pulse number set data and a pulse level of the terminal voltage is set by the pulse level set data stored in the register, and
wherein the pulse number of the second pulse signal is plural.

2. The transmission circuit of claim 1, further comprising:
a first pulse signal generator configured to generate the first pulse signal;
a second pulse signal generator configured to generate the second pulse signal after the generation of the first pulse signal is stopped;
a logical summing unit configured to generate a third pulse signal by performing a logical summing operation for the first pulse signal and the second pulse signal; and
a driver configured to drive the terminal voltage using the third pulse signal.

3. The transmission circuit of claim 2, further comprising an oscillator configured to supply a common driving clock signal to both of the first pulse signal generator and the second pulse signal generator.

4. The transmission circuit of claim 2, wherein the driver includes a transformer configured to generate the terminal voltage based on the third pulse signal, and
wherein a turns ratio of the transformer is switched based on the pulse level set data.

5. A semiconductor device comprising:
transmission circuit of claim 1;
a reception circuit configured to receive a reflected signal detected by the ultrasonic vibrator; and
a control circuit configured to control a transmission operation of the transmission circuit and a reception operation of the reception circuit, wherein the transmission circuit, the reception circuit and the control circuit are integrated into a single chip.

6. The semiconductor device of claim 5, wherein the pulse number of the second pulse signal and the pulse level of the terminal voltage are stored in the register based on externally-input set data.

7. An ultrasonic sensor comprising
a semiconductor device of claim 5.

8. A vehicle comprising an ultrasonic sensor of claim 7 as at least one of a corner sonar and a back sonar.

9. The transmission circuit of claim 1, wherein a pulse level of a second pulse of the second pulse signal is lower than a pulse level of a first pulse of the second pulse signal.

10. A transmission circuit comprising:
an ultrasonic vibrator configured to generate an ultrasonic signal,
wherein the transmission circuit transmits the ultrasonic signal from the ultrasonic vibrator by driving a terminal voltage of the ultrasonic vibrator using a first pulse signal and then further driving the terminal voltage using a second pulse signal having an opposite phase to the first pulse signal, and
wherein the pulse number of the second pulse signal is plural.

11. The transmission circuit of claim 10, comprising:
a first pulse signal generator configured to generate the first pulse signal;
a second pulse signal generator configured to generate the second pulse signal after the generation of the first pulse signal is stopped;
a logical summing unit configured to generate a third pulse signal by performing a logical summing operation for the first pulse signal and the second pulse signal; and
a driver configured to drive the terminal voltage using the third pulse signal.

12. The transmission circuit of claim 11, wherein the second pulse signal generator sets the pulse number of the second pulse signal by a pulse number set data based on a register.

13. The transmission circuit of claim 12, wherein a pulse level of a second pulse of the second pulse signal is lower than a pulse level of a first pulse of the second pulse signal.

14. A semiconductor device comprising:
a transmission circuit of claim 11;
a reception circuit configured to receive a reflected signal detected by the ultrasonic vibrator; and
a control circuit configured to control a transmission operation of the transmission circuit and a reception operation of the reception circuit, wherein the transmission circuit, the reception circuit and the control circuit are integrated into a single chip.

\* \* \* \* \*